(12) United States Patent
Tsukane et al.

(10) Patent No.: US 10,456,710 B2
(45) Date of Patent: Oct. 29, 2019

(54) LIQUID CRYSTAL MATERIAL PROCESSING DEVICE, METHOD OF PROCESSING LIQUID CRYSTAL MATERIAL, METHOD OF MANUFACTURING LIQUID CRYSTAL DISPLAY PANEL, AND LIQUID CRYSTAL DISPLAY DEVICE

(71) Applicant: Japan Display Inc., Minato-ku (JP)

(72) Inventors: Midori Tsukane, Tokyo (JP); Daiichi Suzuki, Tokyo (JP); Yoshifumi Saeki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 639 days.

(21) Appl. No.: 15/198,667

(22) Filed: Jun. 30, 2016

(65) Prior Publication Data

US 2017/0014732 A1    Jan. 19, 2017

(30) Foreign Application Priority Data

Jul. 13, 2015    (JP) .................................. 2015-139766

(51) Int. Cl.
*B01D 11/04*       (2006.01)
*G02F 1/1341*      (2006.01)
(Continued)

(52) U.S. Cl.
CPC ...... *B01D 11/0446* (2013.01); *B01D 11/0492* (2013.01); *B01F 3/2223* (2013.01);
(Continued)

(58) Field of Classification Search
CPC ............ B01D 11/0446; B01D 11/0492; G02F 1/1303; G02F 1/1341; G02F 2001/13415;
(Continued)

(56) References Cited

U.S. PATENT DOCUMENTS 3,701,368 A  *  10/1972  Stern ..................... G02F 1/1341
                                                    141/1
5,803,137 A  *   9/1998  Shimotoyodome ... G02F 1/1341
                                                    141/67
(Continued)

FOREIGN PATENT DOCUMENTS

JP         60230636 A   * 11/1985   ........... G02F 1/1341
JP         61116326 A   *  6/1986   ........... G02F 1/1341
(Continued)

*Primary Examiner* — Charles Cooley
(74) *Attorney, Agent, or Firm* — Oblon, McClelland, Maier & Neustadt, L.L.P.

(57) ABSTRACT

According to one embodiment, the liquid crystal material processing device includes a syringe containing contents composed of a liquid crystal material and the like, having a distal end portion constituting a first discharge pipe, an agitation mechanism agitating the contents of the syringe, a vacuum chamber having a second discharge pipe penetrating the bottom to connect to the first discharge pipe of the syringe. The agitation mechanism agitates the liquid crystal material and the pure water in the syringe, and purifies the liquid crystal material by causing water-soluble impurities to transfer to the pure water. The agitation mechanism agitates the liquid crystal material remaining in the syringe after the water layer has been discharged. The evacuation mechanism evacuates the vacuum chamber and causes the liquid crystal material to be degassed while the remaining liquid crystal material is agitated.

12 Claims, 3 Drawing Sheets

(51) Int. Cl.
*G02F 1/13* (2006.01)
*B01F 13/06* (2006.01)
*B01F 3/22* (2006.01)
*B01F 15/00* (2006.01)

(52) U.S. Cl.
CPC ........ *B01F 13/06* (2013.01); *B01F 15/00993* (2013.01); *G02F 1/1303* (2013.01); *G02F 1/1341* (2013.01); *G02F 2001/13415* (2013.01)

(58) Field of Classification Search
CPC  B01F 3/2021; B01F 3/2223; B01F 15/00993; B01F 13/06
USPC ......................................................... 366/139
See application file for complete search history.

(56) References Cited

U.S. PATENT DOCUMENTS

| | | | | |
|---|---|---|---|---|
| 5,862,839 A * | 1/1999 | Nakamura | ............ | G02F 1/1341 141/237 |
| 6,611,314 B1 * | 8/2003 | Choi | .................... | G02F 1/1341 349/189 |
| 2016/0334655 A1 * | 11/2016 | Tokunaga | ............ | G02F 1/1303 |
| 2017/0014732 A1 * | 1/2017 | Tsukane | ............. | B01D 11/0446 |

FOREIGN PATENT DOCUMENTS

| | | |
|---|---|---|
| JP | 8-193193 | 7/1996 |
| JP | 8-277391 | 10/1996 |

* cited by examiner

LIQUID CRYSTAL MATERIAL PROCESSING DEVICE, METHOD OF PROCESSING LIQUID CRYSTAL MATERIAL, METHOD OF MANUFACTURING LIQUID CRYSTAL DISPLAY PANEL, AND LIQUID CRYSTAL DISPLAY DEVICE

CROSS-REFERENCE TO RELATED APPLICATIONS

This application is based upon and claims the benefit of priority from Japanese Patent Application No. 2015-139766, filed Jul. 13, 2015, the entire contents of which are incorporated herein by reference.

FIELD

Embodiments described herein relate generally to a liquid crystal material processing device, a method of processing a liquid crystal material, a method of manufacturing a liquid crystal display panel, and a liquid crystal display device.

BACKGROUND

Liquid crystal display devices, having features such as lightness in weight, slimness and low power consumption, have been used as display devices for GA devices such as personal computers, televisions, mobile terminals, car navigation devices, game consoles, and the like.

As one of methods of manufacturing liquid crystal display panels, one drop filling (ODE) method has been put into practical use. In the ODE method, a liquid crystal display panel is manufactured by forming a frame-shaped sealing member on a substrate, dropping a liquid crystal material onto an area surrounded by the sealing member, overlaying another substrate on the substrate under vacuum, and releasing the substrates under atmospheric pressure to pressurize the paired substrates with atmospheric pressure. The liquid crystal material to be used in the ODE method is degassed to remove unnecessary components such as air and moisture premixed in the liquid crystal material.

In addition, if impurities are mixed in the liquid crystal material, the liquid crystal material needs to be purified to a high degree since the impurities may cause display failure of the liquid crystal display panel. In the conventional purification of the liquid crystal material, general purification of organic compounds such as recrystallization, distillation, liquid chromatography or the like alone is performed and removal of water-soluble impurities is insufficient. Since the water-soluble impurities contained in the liquid crystal material causes display unevenness on the liquid crystal display panel, technology of removing the water-soluble impurities has been proposed (cf. Patent Literature 1 and Patent Literature 2). The display unevenness on the liquid crystal display panel, caused by the water-soluble impurities contained in the liquid crystal material, is particularly remarkable on the liquid crystal display panel of active matrix driving system.

DETAILED DESCRIPTION

Figure 1:
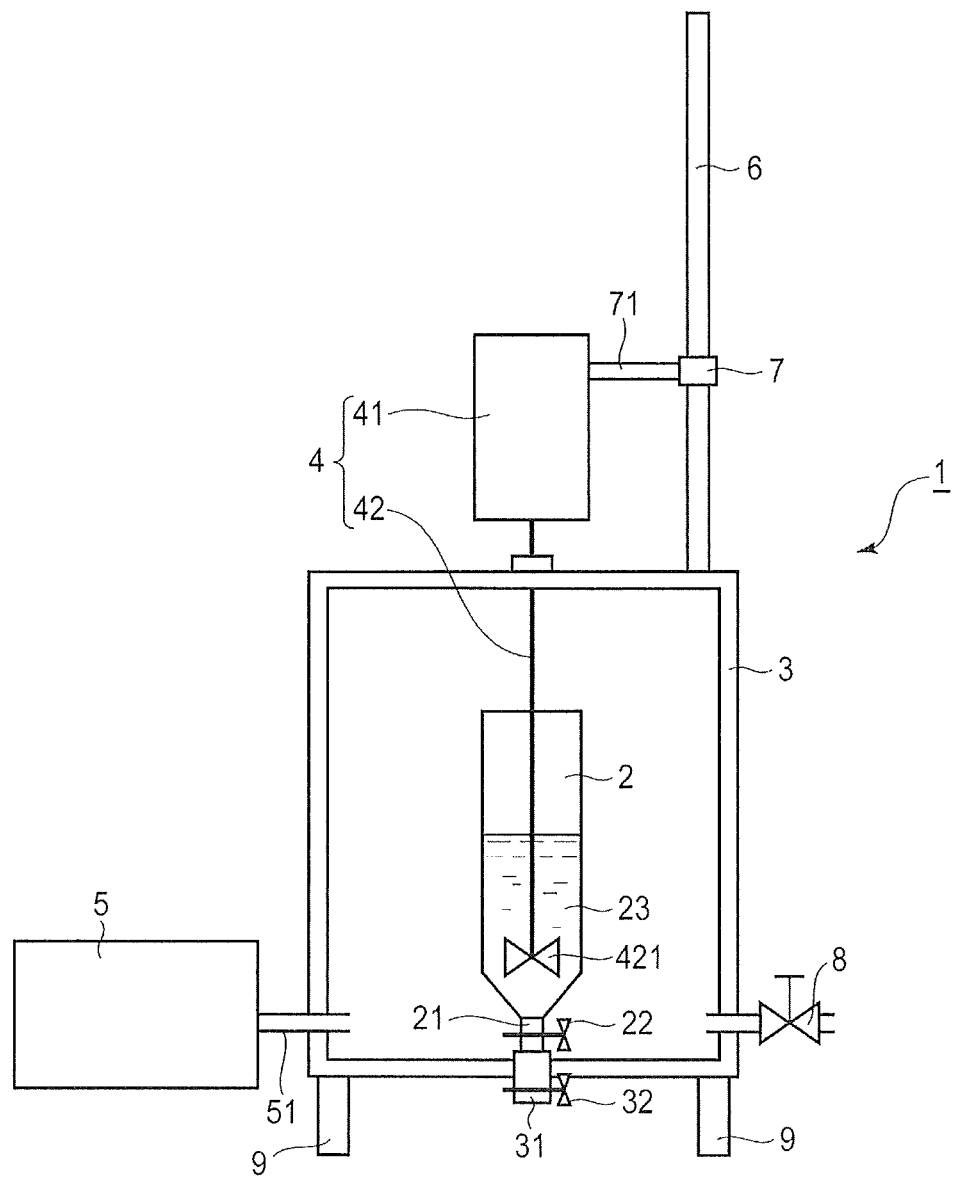
FIG. 1 is a schematic cross-sectional view illustrating an example of a liquid crystal material processing device according to an embodiment.

In general, according to one embodiment, a liquid crystal material processing device for purifying and degassing a liquid crystal material is provided. The liquid crystal material processing device comprises a syringe containing contents composed of a liquid crystal material and pure water or of a liquid crystal material, having a distal end portion constituting a first discharge pipe which defines a first discharge channel therethrough for discharge of the contents, and having a proximal end opening to receive the contents; a first opening/closing mechanism provided at the first discharge pipe to open/close the first discharge channel; an agitation mechanism agitating the contents of the syringe; a vacuum chamber accommodating the syringe; a second discharge pipe penetrating a bottom of the vacuum chamber and extending from an inside to an outside of the vacuum chamber, defining a second discharge channel therethrough for discharging the contents of the syringe to the outside of the vacuum chamber, inside the second discharge pipe, and accommodating the syringe in the vacuum chamber by detachably connecting to the first discharge pipe of the syringe; a second opening/closing mechanism provided at the second discharge pipe to open/close the second discharge channel; and an evacuation mechanism evacuating the vacuum chamber to set the inside of the vacuum chamber under vacuum. When the contents of the syringe accommodated in the vacuum chamber are composed of the liquid crystal material and the pure water, the agitation mechanism agitating the liquid crystal material and the pure water, and purifying the liquid crystal material by causing water-soluble impurities contained in the liquid crystal material to transfer to the pure water. When the contents composed of the liquid crystal material and the pure water are left to stand still and separated into a liquid crystal material layer of an upper layer and a water layer of a lower layer after the agitation has been stopped, the first opening/closing mechanism and the second opening/closing mechanism opening the first discharge channel and the second discharge channel, respectively, and allowing the water layer of the lower layer to be discharged to the outside of the vacuum chamber through the first discharge channel and the second discharge channel, respectively. The first opening/closing mechanism closing the first discharge channel after the water layer of the lower layer has been discharged, and the agitation mechanism agitating the liquid crystal material remaining in the syringe after the water layer of the lower layer has been discharged. The evacuation mechanism evacuating the vacuum chamber and causing the liquid crystal material to be degassed through the opened proximal end of the syringe while the remaining liquid crystal material is agitated.

According to another embodiment, a method of processing a liquid crystal material is provided. The method of processing a liquid crystal material comprises agitating and mixing the liquid crystal material and pure water in a syringe accommodated in a vacuum chamber, purifying the liquid crystal material by transferring water-soluble impurities contained in the liquid crystal material to the pure water, stopping the agitation, and separating the mixture into a liquid crystal material layer of an upper layer and a water layer of a lower layer by leaving the mixture to stand still;

discharging the water layer of the lower layer from the syringe to an outside of the vacuum chamber; and evacuating the vacuum chamber and degassing the liquid crystal material while agitating the liquid crystal material remaining in the syringe after discharging the water layer of the lower layer.

According to yet another embodiment, a method of manufacturing a liquid crystal display panel is provided. The method of manufacturing a liquid crystal display panel comprises installing, in a one drop filling device, a syringe containing a liquid crystal material purified and degassed in the syringe by the liquid crystal material processing device of claim 1, and manufacturing the liquid crystal display panel by one drop filling method.

According to yet another embodiment, a liquid crystal display device is provided. The liquid crystal display device comprises a liquid crystal display panel including an array substrate, a counter substrate disposed to be opposed to the array substrate, and a liquid crystal layer of a liquid crystal material held between the array substrate and the counter substrate, the liquid crystal material being processed by the method of processing the liquid crystal material of claim 6.

A liquid crystal material processing device according to an embodiment will be described below in detail with reference to the accompanying drawings.

FIG. 1 is a schematic cross-sectional view illustrating a liquid crystal material processing device 1 according to an embodiment.

The liquid crystal material processing device 1 comprises a syringe 2, a vacuum chamber 3 which accommodates the syringe 2, an agitation mechanism 4 which agitates contents 23 of the syringe 2, and an evacuation mechanism 5 which evacuates the vacuum chamber 3.

The syringe 2 is a cylindrical member and contains the contents 23 composed of the liquid crystal material and pure water or of the liquid crystal material alone. A distal portion of the syringe 2 constitutes a first discharge pipe 21 which defines a first discharge channel therethrough for discharge of the contents 23. A proximal end of the syringe 2 is opened to take in the contents 23. In addition, a first opening/closing mechanism 22 for opening/closing the first discharge channel is provided on the first discharge pipe 21 at the distal portion of the syringe 2. A cock or valve which opens and closes the first discharge channel can be used as the first opening/closing mechanism 22. The syringe 2 is not particularly limited but is preferably formed of, for example, a transparent material such as glass or resin.

The vacuum chamber 3 is shaped in, for example, a hollow rectangular parallelepiped and accommodates the syringe 2. The evacuation mechanism 5 is connected to the vacuum chamber 3 via an evacuation pipe 51. The vacuum chamber 3 is equipped with an airtight opening/closing door (not shown) on, for example, its side wall, to allow the syringe 2 to be accommodated. The vacuum chamber 3 is equipped with a second discharge pipe 31 provided to penetrate its bottom from the inside to the outside of the vacuum chamber 3. The second discharge pipe 31 allows the syringe 2 to be accommodated in the vacuum chamber 3 by detachably connecting with the first discharge pipe 21 of the syringe 2. This connection can be made by inserting the second discharge pipe 31 into the first discharge pipe 21 or inserting the first discharge pipe 21 into the second discharge pipe 31 in accordance with the relationship in size between the first discharge pipe 21 and the second discharge pipe 31. The second discharge pipe 31 defines a second discharge channel therethrough for discharging the contents 23 of the connected syringe 2 to the outside of the vacuum chamber 3. In addition, a second opening/closing mechanism 32 for opening/closing the second discharge channel is provided on the second discharge pipe 31, outside the vacuum chamber 3. A cock or valve which opens and closes the second discharge channel can be used as the second opening/closing mechanism 32. Foot members 9 may be provided on the bottom surface of the vacuum chamber 3 to support the vacuum chamber 3.

The evacuation mechanism 5 is connected to the vacuum chamber 3 and evacuates the vacuum chamber 3 to set the inside of the vacuum chamber 3 in the vacuum state. A vacuum pump can be used as the evacuation mechanism 5. The evacuation pipe 51 is provided on a side wall of the vacuum chamber 3, and the vacuum pump 5 is connected to the evacuation pipe 51. An air release valve 8 is provided through the side wall of the vacuum chamber 3. The air release valve 8 returns the evacuated state in the vacuum chamber 3 to atmospheric pressure.

The agitation mechanism 4 comprises, for example, a motor 41 and an agitator 42 provided with blades 421 rotated by a driving force of the motor 41. A guide pole 6 is provided on an upper portion of the vacuum chamber 3, and a vertically movable member 7 is attached to the guide pole 6 so as to be guided by the guide pole 6 and vertically movable. The motor 41 is held by a connection bar 71 connected to the vertically movable member 7. If the vertically movable member 7 is moved downwardly along the guide pole 6, the agitator 42 attached to the motor 41 is guided into the syringe 2 connected to the second discharge pipe 31. If the vertically movable member 7 is moved upwardly, the agitator 42 attached to the motor 41 is moved to the outside of the syringe 2.

In the example illustrated, the motor 41 is provided outside the vacuum chamber 3, and a shaft of the agitator 42 connected to the motor 41 penetrates the vacuum chamber 3. The present embodiment is not limited to this, but both the agitator 42 and the motor 41 may be accommodated in the vacuum chamber 3. In addition, the agitation mechanism 4 is not limited to the motor 41 and the agitator 42, but can be variously constituted as, for example, a device configured to apply ultrasonic vibration to the syringe 2 inside the vacuum chamber 3.

When the liquid crystal material is processed by using the liquid crystal material processing device 1, the airtight opening/closing door (not shown) provided on the side wall of the vacuum chamber 3 is first opened. Next, the vertically movable member 7 is moved upwardly along the guide pole 6, and the agitator 42 attached to the motor 41 is moved upwardly. The syringe 2 containing the contents 23 composed of the liquid crystal material and pure water is accommodated in the vacuum chamber 3. The syringe 2 can be accommodated in the vacuum chamber 3 in a state in which the contents 23 are contained in the syringe 2, by setting the first opening/closing mechanism 22 of the syringe 2 to the closed state. At this time, the syringe 2 is accommodated in the vacuum chamber 3 by connecting the first discharge pipe 21 of the syringe 2 to the second discharge pipe 31. The proportion of pure water to the liquid crystal material of the contents 23 of the syringe 2 is preferably a proportion of 1 part by weight or more and less than 5 parts by weight of pure water to 100 parts by weight of liquid crystal material. If the pure water is less than 1 part by weight, the water-soluble impurities contained in the liquid crystal material can hardly be transferred completely to the pure water. If the pure water is 5 parts by weight or more, a problem arises that when separation is insufficient after the agitation and still standing and moisture remains in the liquid crystal, removal of the moisture in the vacuum degassing takes much time.

As the pure water, pure water having a specific resistance of 16MΩ·cm or more can be used. As the pure water, ultrapure water having a specific resistance of 18MΩ·cm or more and the amount of impurity of 0.001 μg/L or less is preferable.

After the syringe 2 is accommodated in the vacuum chamber 3, the vertically movable member 7 is moved downwardly along the guide pole 6, and the agitator 42 attached to the motor 41 is guided into the syringe 2. Next, the airtight opening/closing door (not shown) provided on the side wall of the vacuum chamber 3 is closed.

Next, the contents 23 composed of the liquid crystal material and the pure water, in the syringe 2, are agitated and mixed by the agitator 42 which is rotated by the motor 41. The agitation of the contents 23 can be performed, for example, at 5 to 100 rpm for 1 to 60 minutes. At this time, the water-soluble impurities contained in the liquid crystal material can be transferred to the pure water by making both the liquid crystal material and the pure water sufficiently contact each other. In the agitation, the water-soluble impurities can be further transferred to the pure water with good efficiency by heating the contents 23 to the extent to which the physical properties of the liquid crystal material are not affected.

Next, after stopping the agitation, when the contents (mixture of the liquid crystal material and the pure water) 23 of the syringe 2 are left to stand still, the mixture 23 is separated into an upper layer of a liquid crystal material layer and a lower layer of a water layer, based on difference in specific gravity. Therefore, the first opening/closing mechanism 22 and the second opening/closing mechanism 32 are set to the opened state to open the first discharge channel and the second discharge channel, respectively. Then, the water layer, the lower layer, is drained to the outside of the vacuum chamber 3 via the first discharge channel and the second discharge channel. After the water layer, the lower layer, is drained, the first opening/closing mechanism 22 is set to the closed state to close the first discharge channel. The water-soluble impurities can be removed from the liquid crystal material by draining the water layer to which the water-soluble impurities contained in the liquid crystal material has been transferred, to the outside of the vacuum chamber 3. The above-explained operation of purifying the liquid crystal material can be performed under atmospheric pressure.

After the water layer is drained, the first opening/closing mechanism 22 and the second opening/closing mechanism 32 are set to the closed state, the agitator 42 is rotated by driving the motor 41 to agitate the contents 23 composed of the liquid crystal material left in the syringe 2. The liquid crystal material is degassed by evacuating the vacuum chamber 3 by the vacuum pump 5 while the liquid crystal material is agitated. The agitation of the liquid crystal material can be performed, for example, at 50 to 100 rpm for 5 to 10 hours. The inside of the vacuum chamber 3 can be degassed by reducing the pressure to, for example, 10 Pa or lower. The mixed-in air and moisture can be removed rapidly and certainly as air bubbles by agitating and degassing the liquid crystal material under vacuum. The agitation has an effect of vertically circulating the liquid crystal material, moving the air bubbles which may exist toward the liquid level, and promoting separation of the air bubbles. By the degassing, the moisture remaining after the purification can also be removed as air bubbles. According to the liquid crystal material processing device 1, the purification and the degassing of the liquid crystal material can be thus performed efficiently as sequential operations using the same syringe 2, at the same workplace (i.e., in the vacuum chamber).

After the degassing of the liquid crystal material has been finished, the vertically movable member 7 is moved upwardly along the guide pole 6, and the agitator 42 attached to the motor 41 is moved upwardly. Next, the air release valve 8 is opened and the inside of the vacuum chamber 3 is returned to atmospheric pressure.

The syringe 2 containing the liquid crystal material subjected to purification and degassing in the processing device 1 is taken out of the vacuum chamber 3 and installed in a one drop filling device. Liquid crystal display panel can be manufactured by one drop filling method. Thus, by performing the steps of purification, degassing and liquid crystal drop in the same syringe 2, the liquid crystal display panel can be efficiently manufactured and mixing-in of the impurities and air caused by vessel transfer can be prevented.

Figure 2:
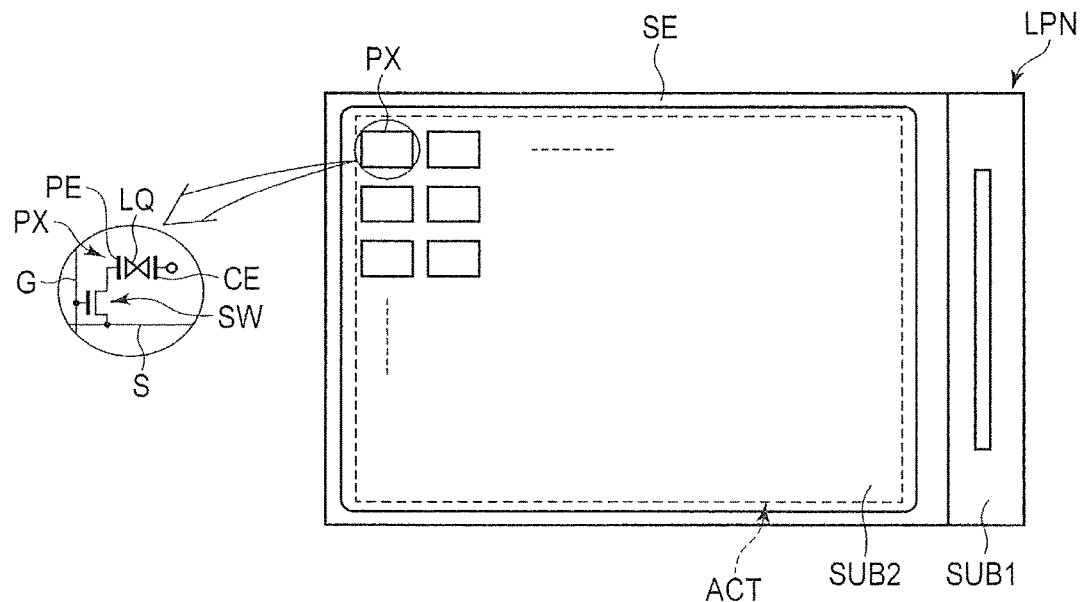
FIG. 2 is a plan view illustrating an example of a configuration of the liquid crystal display panel.

FIG. 2 is a plan view illustrating an example of the configuration of the liquid crystal display panel LPN.

An array substrate SUB1 and a counter substrate SUB2 are bonded to each other by a sealing member SE with a predetermined cell gap formed between the substrates. A liquid crystal layer LQ is held on an inner side surrounded by the sealing member SE, in the cell gap between the array substrate SUB1 and the counter substrate SUB2. The liquid crystal display panel LPN includes an active area ACT on which an image is displayed, in an area surrounded by the sealing member SE. The active area ACT is formed in, for example, an approximately rectangular shape, and is constituted by a number of pixels PX arrayed in a matrix. The active area ACT may be shaped in the other polygon, and its edges may be curved.

The array substrate SUB1 includes, in the active area ACT, a gate line G, a source line S intersecting the gate line G, a switching element SW electrically connected to the gate line G and the source line S in each pixel PX, a pixel electrode PE electrically connected to the switching element SW in each pixel PX, and the like. A common electrode CE is disposed or at least one of the array substrate SUB1 and the counter substrate SUB2. The sealing member SE is formed in a closed loop shape surrounding the active area ACT. In the illustrated example, the sealing member SE is formed in a rectangular shape.

Figure 3:
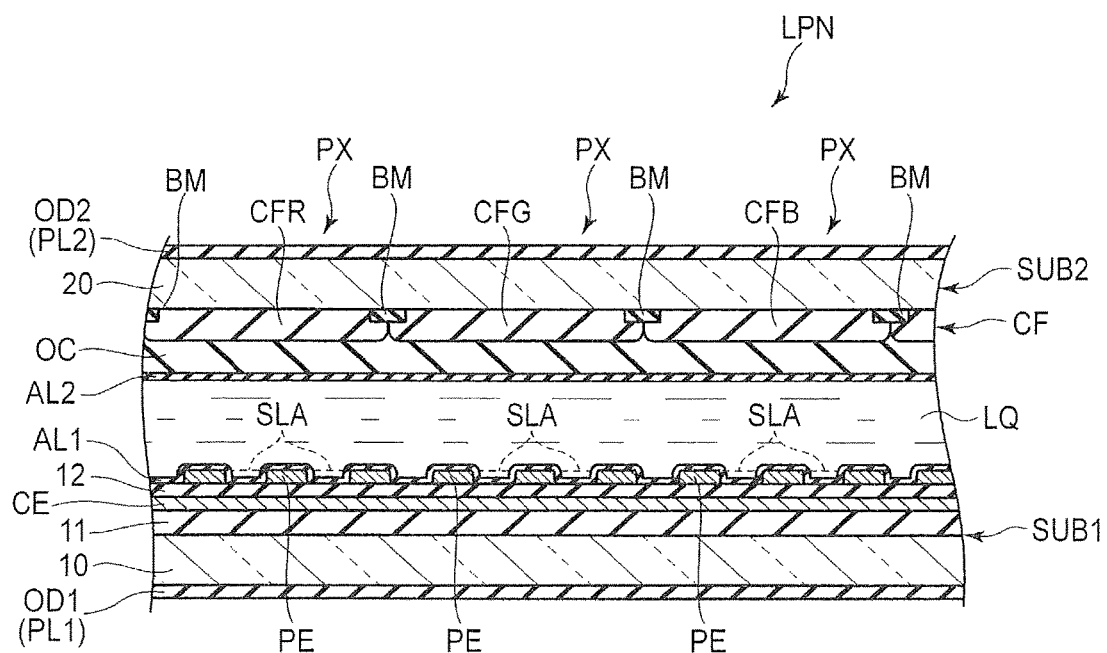
FIG. 3 is a cross-sectional view partially illustrating the configuration of the liquid crystal display panel of FIG. 2.

FIG. 3 is a cross-sectional view partially illustrating the configuration of the liquid crystal display panel LPN of FIG. 2.

The array substrate SUB1 is formed by using a first insulating substrate 10, which is transparent, such as a glass substrate or a resin substrate. The array substrate SUB1 includes the common electrode CE, the pixel electrodes PE, a first insulating film 11, a second insulating film 12, a first alignment film AL1 and the like, on the side of the first insulating substrate 10, which is opposed to the counter substrate SUB2. The common electrode CE is formed on the first insulating film 11. The second insulating film 12 covers the common electrode CE. It should be noted that gate lines, source lines, switching elements and the like (not shown) are formed between the first insulating substrate 10 and the first insulating film 11. The pixel electrodes PE are formed on the second insulating film 12. The pixel electrodes PE include slits SLA. The pixel electrodes PE are covered with the first alignment film AL1. The common electrode CE, the pixel electrodes PE are formed of, for example, a transparent, electrically conductive material such as indium tin oxide (ITO) or indium zinc oxide (IZO).

The counter substrate SUB2 is formed by using a second insulating substrate 20, which is transparent, such as a glass substrate or a resin substrate. The counter substrate SUB2 includes a light-shielding layer BM, a color filter CF, an overcoat layer CC, a second alignment film AL2 and the like, on the side of the second insulating substrate 20, which is opposed to the array substrate SUB1. The light-shielding layer BM is formed on an inner surface of the second insulating substrate 20, which is opposed to the array substrate SUB1. The light-shielding layer BM is formed of a black resin material or a light-shielding metal material. The color filter CE is formed on the inner surface of the second insulating substrate 20 and partially overlaid on the light shielding layer BM. The color filter CF may comprise color filter segments CFR, CFG and CFB. The color filter segments are opposed to the pixel electrodes PE, respectively, through the liquid crystal layer LQ. The color filter segment CFR is a red color filter segment, which is formed of a red-colored resin material. The color filter segment CFG is a green color filter segment, which is formed of a green-colored resin material. The color filter segment CFB is a blue color filter segment, which is formed of a blue-colored resin material. The overcoat layer OC covers the color filter CF. The overcoat layer OC is formed of a transparent resin material. The overcoat layer OC is covered with the second alignment film AL2. The first alignment film AL1 and the second alignment film AL2 are formed of a material which exhibits horizontal alignment properties.

The array substrate SUB1 and the counter substrate SUB2 are bonded to each other with a predetermined cell gap formed there between. The liquid crystal layer LQ is sealed between the first alignment film AL1 and the second alignment film AL2.

In the example illustrated, the color filter CF is formed on the counter substrate SUB2 but may be formed on the array substrate SUB1. For example, the color filter CF may be replaced with the first insulating film 11 or disposed between the first insulating substrate 10 and the first insulating film 11.

In the example illustrated in FIG. 2, the liquid crystal display panel LPN in which the pixel electrode PE and the common electrode CE are formed on the array substrate SUB1 is illustrated but liquid crystal display panels can be arbitrarily designed in various types of configuration in accordance with the display mode of liquid crystal display panels.

The detailed configuration of the liquid crystal display panel LPN is not explained here but, the pixel electrode PE is disposed on the array substrate SUB1 while the common electrode CE is disposed on the counter substrate SUB2, in a mode using a longitudinal electric field along the normal line of the Main substrate surface or a display mode using an oblique electric field which is angled with respect to the main substrate surface. In addition, both the pixel electrode PE and the common electrode CE are disposed on the array substrate SUB1, in a mode using a lateral electric field extending along the main substrate surface. Furthermore, the liquid crystal display panel LPN may be configured to correspond to a display mode using an arbitrary combination of the above-explained longitudinal, lateral, and oblique electric fields.

Figure 4:
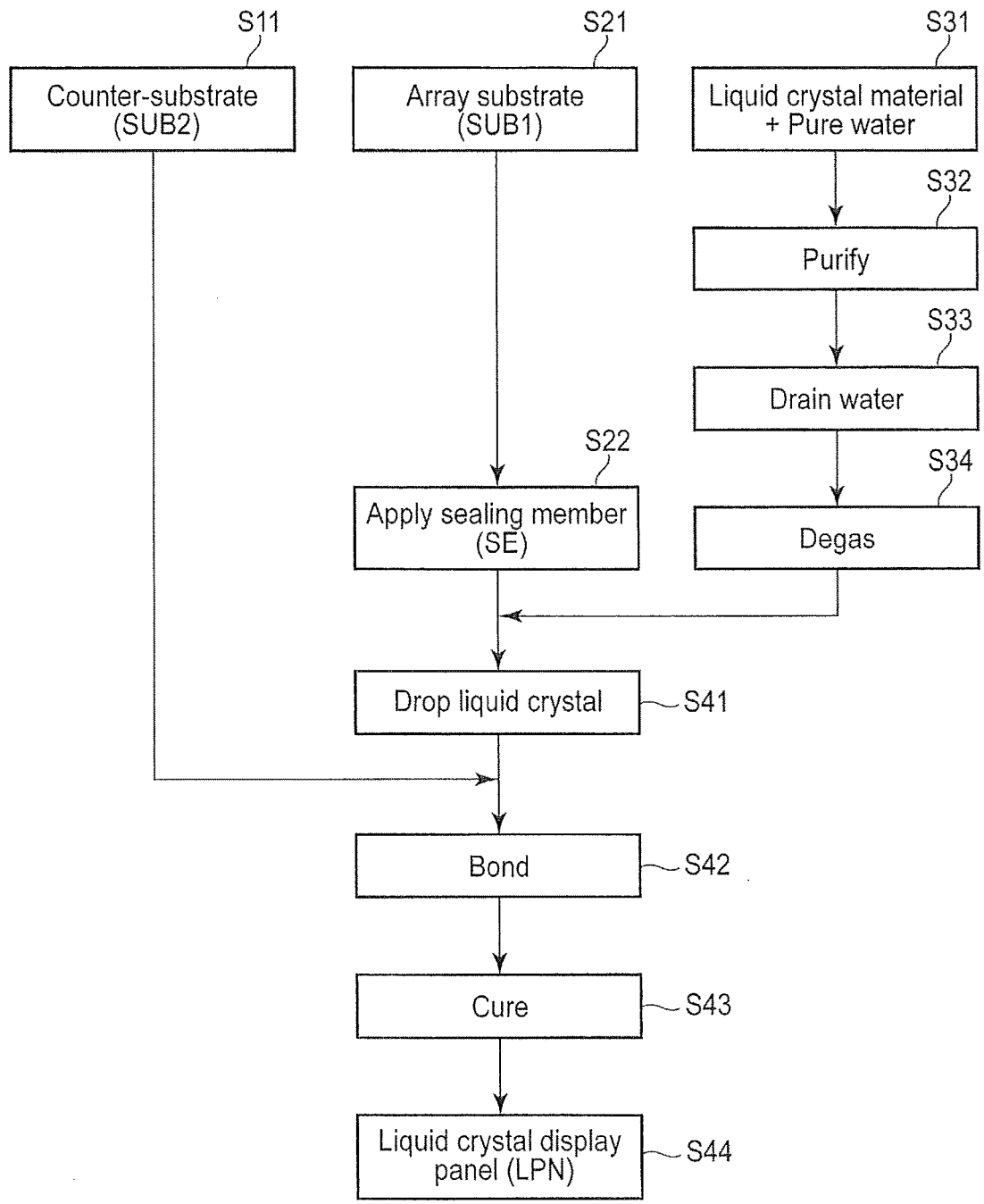
FIG. 4 is a flowchart illustrating a method of manufacturing a liquid crystal display panel, with the liquid crystal display panel of FIG. 2 and FIG. 3, taken as an example.

FIG. 4 is a flowchart illustrating a method of manufacturing a liquid crystal display panel with the liquid crystal display panel LPN of FIG. 2 and FIG. 3, taken as an example.

First, the array substrate SUB1 and the counter substrate SUB2 are prepared (steps S11 and S21). Next, the sealing member SE in the closed loop shape surrounding the active area ACT is formed on the array substrate SUB1 by using a dispenser or a screen printing plate (step S22).

On the other hand, the liquid crystal material and the pure water are placed in the syringe, the purification is carried out (steps S31 and S32), the water is drained and degassing is performed (steps S33 and S34), by the liquid crystal material processing device, as explained above. The syringe containing the purified and degassed liquid crystal material is installed in the one drop filling device.

The liquid crystal material is dropped onto the area (including the active area ACT) surrounded by the sealing member SE, by the one drop filling device, under vacuum atmosphere (step S41). The liquid crystal material is dropped after formation of the sealing member SE on the array substrate SUB1 in FIG. 4, but the liquid crystal material may be dropped after formation of the sealing member SE on the counter substrate SUB2. Thereafter, the counter substrate SUB2 and the array substrate SUB1 are overlaid and bonded to each other under vacuum (step S42). Next, by introducing air to set atmospheric pressure atmosphere, the sealing member SE is crushed due to a difference in internal and external pressures between the array substrate SUB1 and the counter substrate SUB2, the liquid crystal material extends between the array substrate SUB1 and the counter substrate SUB2, and the liquid crystal layer LQ is formed in the predetermined cell gap.

Then, the sealing member SE is cured by irradiating the sealing member SE with ultraviolet rays or heating the sealing member SE (step S43). The liquid crystal display panel LPN holding the liquid crystal layer LQ between the array substrate SUB1 and the counter substrate SUB2 is thus manufactured (step S44).

Example and Comparative Example will be described. The degree of purification of each of the liquid crystal materials of Example and Comparative Example was confirmed by measuring the voltage holding ratio (VHR) of each of the liquid crystal materials. The voltage holding ratio (VHR) of each of Example and Comparative Example was measured by using a test cell under measurement conditions explained below.

The test cell was fabricated by forming alignment films on ITO-equipped substrates having an electrode area of 2 cm$^2$, performing the alignment treatment, bonding the substrates and the alignment films to attain electrically controlled birefringence (BCE) alignment through spacers having a diameter of approximately 3 μm, producing a vacant cell including two inlet ports, filling the liquid crystal material and sealing the inlet ports by UV resin.

The measurement was performed by applying the source voltage of the pulse voltage (i.e., a voltage of +5V and −5V with a pulse width of 60 μsec) to the test cell at a measurement temperature of 85° C. and shutting down the source voltage. Subsequently, the change in interelectrode voltage of the test cell was measured during the frame period of 1.67 msec. An integral value (area A) of the measured voltage to the time was calculated. On the other hand, an integral value (area B) of the voltage to the time in a case where the interelectrode voltage was not changed during the frame period of 1.67 msec was calculated. The voltage holding ratio was calculated by an equation:

(area $A$/area $B$)×100(%).

The liquid crystal material used in Example was purified and degassed in the following manner using the liquid crystal processing device illustrated in FIG. 1. First, 150 g of liquid crystal material and 5 g of pure water were poured into the syringe. Negative nematic liquid crystal was used as the liquid crystal material. The pure water had a specific resistance of 16MΩ·cm or more. By further purifying the pure water, the specific resistance can be increased to 18MΩ·cm or more and the amount of impurity can be reduced to 0.001 µg/L or less. The syringe had a diameter of 4 cm and a full length of 30 cm. Then, the syringe was accommodated in the vacuum chamber of the liquid crystal material processing device. Subsequently, the contents composed of the liquid crystal material and the pure water in the syringe were agitated at 50 rpm for 10 minutes by the agitator rotated by the motor. Then, when the contents composed of the liquid crystal material and the pure water were left to stand still for 15 minutes, the contents were separated into an upper layer, i.e., a liquid crystal material layer and a lower layer, i.e., a water layer. The water layer of the lower layer was drained to the outside of the vacuum chamber. Next, the contents containing the liquid crystal material in the syringe were agitated and degassed in vacuum. The pressure in the vacuum chamber was reduced to 5 Pa and the contents were agitated at 50 rpm for 5 hours.

By using the liquid crystal material purified and degassed by the liquid crystal material processing device shown in FIG. 1, the test cell was produced and the voltage holding ratio was measured under the above measurement conditions. The voltage holding ratio in Example was 91%.

In contrast, the liquid crystal material used in Comparative Example was not purified or degassed by the liquid crystal processing device, but subjected to degassing alone by the existing degassing device. The other conditions were the same as those of Example, the test cell was produced and the voltage holding ratio was measured under the above measurement conditions. The voltage holding ratio in Comparative Example was 87%.

It can be understood from the result that the voltage holding ratio of the Example was improved as compared with Comparative Example and that the water-soluble impurities contained in the liquid crystal material were significantly reduced by the purification and degassing in the liquid crystal processing device shown in FIG. 1. The display unevenness of the liquid crystal display panel, which is caused by the water-soluble impurities contained in the liquid crystal material, can be prevented by the liquid crystal material processing device.

According to the liquid crystal material processing device of the embodiment, as explained above, the purification and the degassing of the liquid crystal material can be efficiently performed as sequential operations using the same syringe, at the same workplace (i.e., in the vacuum chamber). In addition, the liquid crystal display panel can be manufactured with good efficiency by using the same syringe.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of processing a liquid crystal material, comprising:
    agitating and mixing the liquid crystal material and pure water in a syringe accommodated in a vacuum chamber, purifying the liquid crystal material by transferring water-soluble impurities contained in the liquid crystal material to the pure water, stopping the agitation, and separating the mixture into a liquid crystal material layer of an upper layer and a water layer of a lower layer by leaving the mixture to stand still;
    discharging the water layer of the lower layer from the syringe to an outside of the vacuum chamber; and
    evacuating the vacuum chamber and degassing the liquid crystal material while agitating the liquid crystal material remaining in the syringe after discharging the water layer of the lower layer.

2. The method of claim 1, wherein
the liquid crystal material and the pure water are agitated and mixed at a proportion of 1 part by weight or more and less than 5 parts by weight of pure water to 100 parts by weight of liquid crystal material.

3. The method of claim 2, wherein
the agitation and mixing of the liquid crystal material and the pure water are performed at 5 to 100 rpm for 1 to 60 minutes.

4. The method of claim 2, wherein
the agitation of the liquid crystal material remaining in the syringe is performed at 50 to 100 rpm for 5 to 10 hours.

5. The method of claim 2, wherein
pure water having a specific resistance of 16MΩ·cm or more is used as the pure water.

6. The method of claim 1, wherein
the agitation and mixing of the liquid crystal material and the pure water are performed at 5 to 100 rpm for 1 to 60 minutes.

7. The method of claim 6, wherein
the agitation of the liquid crystal material remaining in the syringe is performed at 50 to 100 rpm for 5 to 10 hours.

8. The method of claim 6, wherein
pure water having a specific resistance of 16MΩ·cm or more is used as the pure water.

9. The method of claim 1, wherein
the agitation of the liquid crystal material remaining in the syringe is performed at 50 to 100 rpm for 5 to 10 hours.

10. The method of claim 9, wherein
pure water having a specific resistance of 16MΩ·cm or more is used as the pure water.

11. The method of claim 1, wherein
pure water having a specific resistance of 16MΩ·cm or more is used as the pure water.

12. The method of claim 1, wherein
ultrapure water having a specific resistance of 18MΩ·cm or more and an impurity amount of 0.001 µg/L or less is used as the pure water.

* * * * *